(12) United States Patent  
Milch

(10) Patent No.: US 6,429,924 B1
(45) Date of Patent: Aug. 6, 2002

(54) PHOTOFINISHING METHOD

(75) Inventor: James R. Milch, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/726,942

(22) Filed: Nov. 30, 2000

(51) Int. Cl.[7] .................. G03B 27/52; G03B 17/24; G03D 13/00
(52) U.S. Cl. .................. 355/40; 355/27; 396/311; 396/315; 396/567; 396/570
(58) Field of Search ................. 396/311, 315, 396/318, 312–314, 316, 317; 355/40, 41, 27–29, 77

(56) References Cited

U.S. PATENT DOCUMENTS

| | | | |
|---|---|---|---|
| 5,187,518 A | * 2/1993 | Kitagawa | 396/315 |
| 5,519,463 A | 5/1996 | Nakamura et al. | 396/315 |
| 5,583,592 A | * 12/1996 | Kato et al. | 396/318 |
| 5,665,950 A | 9/1997 | Rottner et al. | 235/462.05 |
| 5,758,216 A | * 5/1998 | Arnold | 396/311 |
| 5,771,415 A | * 6/1998 | Matsumura et al. | 395/315 |
| 5,870,639 A | 2/1999 | Constable et al. | 396/315 |
| 6,262,790 B1 | * 7/2001 | Kinjo | 396/311 |

* cited by examiner

Primary Examiner—D. Rutledge
(74) Attorney, Agent, or Firm—Stephen H. Shaw

(57) ABSTRACT

A photofinishing method, including the steps of: exposing machine readable metadata and a scene image within an entire safe frame area on a filmstrip; processing the filmstrip to produce a visible image including the machine readable metadata and the scene image; scanning the safe frame area to produce a digital image; extracting the machine readable metadata from the digital image; extracting the scene image from the digital image; and processing the scene image according to the extracted machine readable metadata.

10 Claims, 8 Drawing Sheets

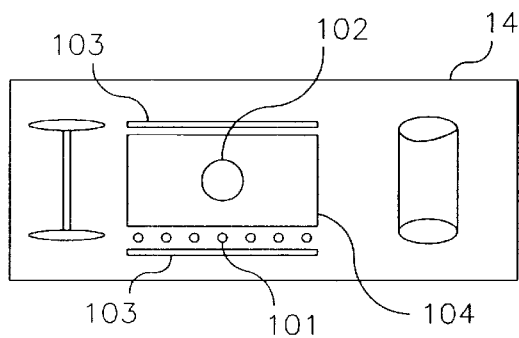
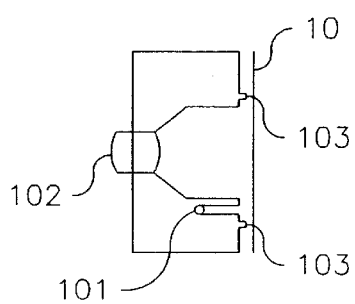
FIG. 4               FIG. 5
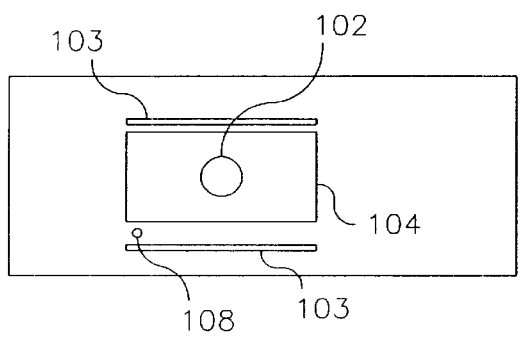
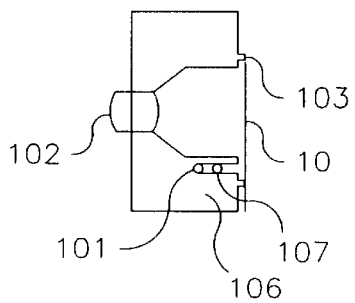
FIG. 6               FIG. 7
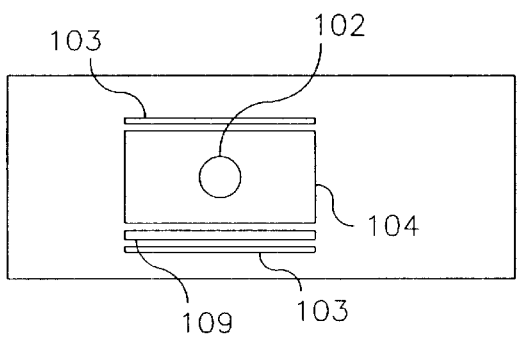
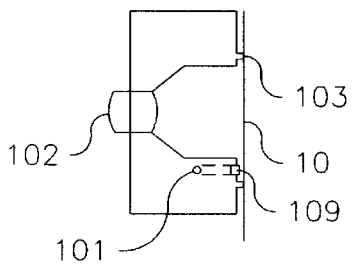
FIG. 8               FIG. 9

PHOTOFINISHING METHOD

FIELD OF THE INVENTION

The invention relates generally to the field of photography, and in particular to photofinishing. More specifically, the invention relates to a method of photofinishing that employs an encoded data pattern placed on photographic film.

BACKGROUND OF THE INVENTION

The 35 mm film system has been on the market for many decades. This film system consists of light-sensitive, AgX media spooled into a cartridge of particular construction; cameras designed to handle this film and expose it to the image of a scene; and photofinishing equipment designed to extract the film, develop it in a chemical bath, and print the image onto photo-sensitive paper. The elements of this film system have co-evolved over many decades into a coherent, working system. Many vendors supply equipment to each part of this film system.

Recently, one portion of the 35 mm film system has changed. Photofinishing equipment that scans the film and converts the image to a digital form has been introduced. Digital data, in some cases, is used directly to create a viewable print, via digital writing. In other cases, the data is stored on a writable magnetic or optical disc, for use by the customer in a computer system. In still other cases, the data is sent by a network to a website or directly to the customer's computer. Even though this development is recent, many companies already supply this type of digitization equipment. The digitization equipment is widely dispersed. Some of the digitization equipment is placed at central locations to where the film cartridges are shipped, and other digital equipment is at retail locations.

Skilled artisans know how to record data on photographic film, either magnetically in a magnetic layer on the film, or optically as latent images on the film. The data, generally known in the imaging industry as metadata, may contain information about the captured scene, or about the photographer's technical preferences, or even contain information on how the image should be reproduced. Metadata is information associated with a picture or with a set of pictures, other than the actual image information itself. When an image has been digitized, we refer to the information that recreates the image as the pixel data; everything else is therefore metadata.

One class of metadata records a photographer's request to modify the reproduction of a specific frame of film. For example, the photographer may request that the central region of the film frame, which is roughly one-quarter the area of the entire frame, be used to produce the final print (otherwise known as, pseudo zoom). Alternatively, in another implementation, the photographer may request that the image be rendered as monochrome and have a sepia tint (i.e., a sepia feature).

A second class of metadata adds information that does not modify the reproduced image. For example, the date on which each frame was exposed may be stored as metadata.

In short, metadata may describe a scene; the device used to capture the scene; the intent of the photographer; the context of the picture; or a request for certain products to be created from the picture data. Metadata may also be used to improve the quality of reproductions; to classify pictures for easy retrieval; or for creating output products.

Metadata is most useful when it is generated directly and automatically in the camera as the scene is captured or shortly thereafter. However, the metadata has to be transported by intermediate components. Afterwards, the metadata is read and used by the processing equipment that creates prints or manages digital data.

In the 35 mm film system, the only practical mechanism for associating metadata with the image or with a roll of images at the capture point is optically marking the film itself. These optical marks must be made in such a way that they can be differentiated from and not interfere with, useful scene recording. They must also be made in such a way that the equipment reading the film can easily measure and interpret them.

In the case of optically recorded metadata, the metadata can be read by photofinishing equipment to control photographic processing and printing operations. For example, U.S. Pat. No. 5,870,639 issued Feb. 9, 1999 to Constable et al. entitled Optical Data Recording Circuit For A Photographic Camera discloses recording latent image metadata called "fat bits" on the marginal edges of an image frame and outside of the area reserved for the image. The areas reserved for the image are herein referred to as the safe frame areas of the film strip. The fat bits are later used to control the aspect ratio of a print produced from the image frame.

It is also known to optically record data such as time and date by superimposing the time and/or date on the image within the safe frame area of the film. See, for example U.S. Pat. No. 5,519,463 issued May 21, 1996 to Nakamura et al. entitled Data Imprinting Device For A Camera. This data, however, is not intended to be machine readable, and is optically reproduced and viewable solely when a print of the image is made.

There are a large variety of 35 mm film cameras on the market. They range from one-time-use cameras that sell for less than ten dollars, to professional cameras that sell for thousands of dollars. Similarly, the features desired by users of these cameras vary greatly. Also, the allowable cost of a marking device for metadata in these cameras varies greatly. Nevertheless, the same photofinishing equipment is generally used for all 35 mm color film, no matter what camera places the image on the film.

In considering the introduction of cameras that write optical metadata to a 35 mm film, the placement of these optical marks on the film is critical. One choice is to place the marks outside the safe frame areas, hence, either between or outside the film's perforations. A second choice is to place the marks in the safe frame area, but between the framed images. From the viewpoint of the camera designer, all of these methods have advantages and disadvantages, and all are quite practical. Both methods have the disadvantage of a limited available area and a limited data storage capacity.

Although digital scanning is becoming quite common, the processing equipment still requires special equipment adaptations in order to handle any information recorded outside the safe frame area of the film. See for example U.S. Pat. No. 5,665,950 issued Sep. 9, 1997 to Rottner et al. entitled Fat Bit Bar Code Reader, which discloses a bar code reader for reading "fat bits" recorded on the edges of photographic film. Because of the extra expense and complexity, these special equipment adaptations for handling information recorded outside of the safe frame area of photographic film are not likely to be widely deployed.

From the viewpoint of the photofinishing equipment designer, the aforementioned methods present very different issues. As noted above, there are many types of digital photofinishing equipment on the market. In every case, the ability to read this additional optical metadata is an add-on to an existing design. In most cases, there is a need to retrofit equipment already in the field. Designing photofinishing equipment requires balancing mechanical, optical, electronic, and software tradeoffs. The introduction of additional information on the film, outside the safe frame area, poses substantial challenges in all these fields. In particular, the software design of photofinishing systems is quite complex, because there are many layers of software between the optical reading device and the image processing subsystem.

Because metadata has proven so useful, there is substantial interest in increasing the amount of metadata embedded in film. However, heretofore substantial photofinishing hardware and software modifications were required to accommodate increased embedded metadata.

There is a need, therefore, for an improved method and apparatus for optically recording and recovering metadata from photographic film that does not require additional and costly photofinishing hardware modifications.

SUMMARY OF THE INVENTION

The need is met according to the present invention by providing a photofinishing method, including the steps of: exposing machine readable metadata and a scene image within an entire safe frame area on a filmstrip; processing the filmstrip to produce a visible image including the machine readable metadata and the scene image; scanning the safe frame area to produce a digital image; extracting the machine readable metadata from the digital image; extracting the scene image from the digital image; and processing the scene image according to the extracted machine readable metadata.

This invention has the advantage that the additional metadata is scanned and transported through the photofinishing system easily, requiring entirely no modification in hardware and only minor modification in a small area of software.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a rear view of the mechanical configuration of a camera capable of generating "dot code," as shown in FIG. 2;

FIG. 5 is a side view of the mechanical configuration of a camera capable of generating "dot code," as shown in FIG. 2;

FIG. 6 is a rear view of the mechanical configuration of a camera capable of generating a "one-dimensional bar code," as shown in FIG. 2;

FIG. 7 is a side view of the mechanical configuration of a camera capable of generating "one-dimensional bar code," as shown in FIG. 2;

FIG. 8 is a rear view of the mechanical configuration of a camera capable of generating "two-dimensional bar code," as shown in FIG. 2;

FIG. 9 is a side view of the mechanical configuration of a camera capable of generating "two-dimensional bar code," as shown in FIG. 2;

DETAILED DESCRIPTION OF THE INVENTION

Figure 1:
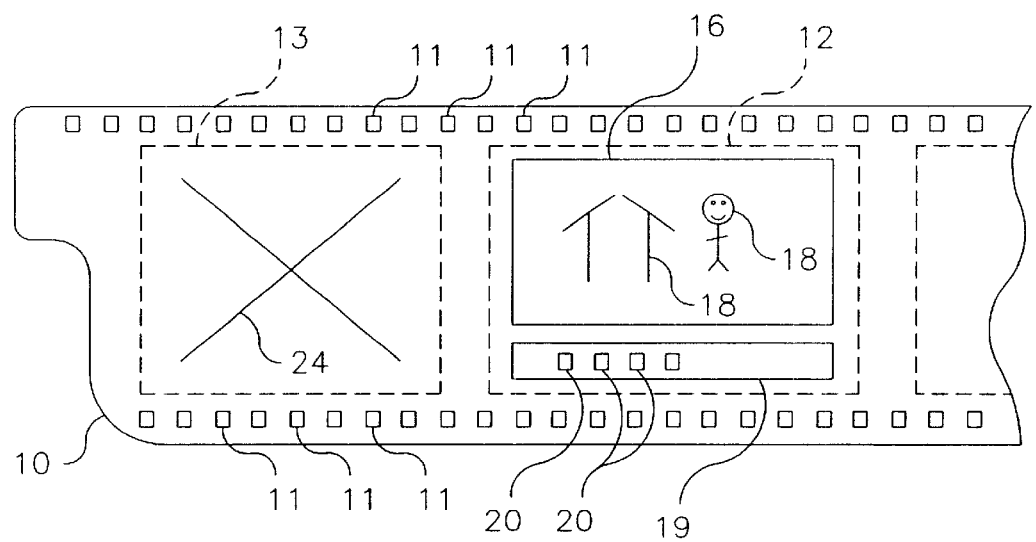
FIG. 1 is a schematic diagram of a filmstrip having machine readable metadata according to the present invention.

According to the present invention metadata is written as optical marks onto 35 mm-format photographic film in a camera, in a manner such that it can be read by all existing 35 mm film scanners. This is accomplished by writing the optical marks in the region of the film commonly used for scene recording, generally known as the "safe frame area" of each frame on the film. These marks consist of a coded pattern of density produced by, e.g., LED devices in the camera. Another part of this safe frame area in each frame will generally contain the image of the scene, cast by a lens. The metadata pattern is designed to be well-isolated from the scene information, either spatially or by a distinctive color pattern. Hence, the present invention affords a person skilled in the art the opportunity to place the metadata pattern within the central image area, thereby competing with the framed images, but also providing differentiation from the framed images in some manner.

One class of metadata comprises a request by the photographer to modify the reproduction of a specific frame of film. For example, the photographer may request that a central region of the film, roughly one-quarter the area of the entire frame, be used to produce the final print (i.e., pseudo zoom). Alternatively in another implementation, the photographer may request that the image be rendered in monochrome with a sepia tint (i.e., sepia feature).

A second class of metadata adds information that does not modify the reproduced image. For example, the date on which each frame was actually exposed may be stored as metadata.

The developed density in the entire frame is read from the film by a scanner and passed serially through a number of hardware and software interfaces, and eventually delivered to a computational engine. This computational engine decodes the coded information and modifies the image data to produce the desired digital image. The coded information may change the way in which the image is reproduced, or may carry information about the scene or about the photographer's preferences.

There is already a large deployed base of 35 mm digital scanning and processing equipment. Even though new equipment is being developed, special adaptations for handling information recorded outside the normal image frame are unlikely to be widely deployed. This invention has the advantage that the additional metadata is scanned and transported through the photofinishing system easily and requires no modification in the hardware and only minor software modifications.

According to the present invention, machine readable metadata is optically recorded on the part of the frame of film called the safe frame area. The safe frame area, by industry convention, is the minimal area on the frame which is read by every scanner for reproducing the image in the frame. The safe frame area also contains the captured image. The entire frame may be read by a scanner and sent to a computer. At this juncture, the computer is able to decode the metadata, thereby allowing a photofinisher to produce the desired digital image, for example, by applying digital resizing to the image.

As shown in FIG. 1, a 35 mm film or filmstrip 10 (used interchangeably herein) has a simple physical layout. A row of perforations 11 is found on each edge of the filmstrip 10. The region between these perforations 11 is commonly used to record the image of a scene 18. There isn't any natural framing defined on the filmstrip 10, therefore, conventionally, the sequential frames of images fall where they may on the filmstrip 10. Many films have latent-image codes (not shown) written on them in the factory. These codes (a form of metadata) are used to identify the film manufacturer and film type. The codes are generally read by specialized devices in the photofinishing equipment. The codes are well-standardized. The devices to read them add substantially to the complexity of designing the photofinishing equipment.

Referring to FIGS. 1, 4 and 5, according to one embodiment of the invention, a conventional 35 mm film or filmstrip 10, delivered from the factory without any special optical markings, includes safe frame areas 12 that are normally intended for receiving exposures. The film 10 is employed in a camera 14 (shown in FIG. 4) that is designed as described below for use with the present invention. The camera 14, is used to capture an image and record it on filmstrip 10. According to the present invention, the safe frame areas 12 that normally receive an optical exposure are subdivided into two regions. One region 16 of the safe frame area 12 receives an optical exposure (not shown) from a lens 102 (shown in FIG. 5) of the camera 14. A second region 19 receives an encoded metadata exposure 20 (further shown in FIG. 2), from a modulated light source such as a light emitting diode (LED) array 101, recessed in a portion of the film gate 104 (shown in FIG. 4) in the camera 14. The camera 14 is more fully described below according to FIGS. 4, 5, 6, 7, 8 and 9.

Figure 2:
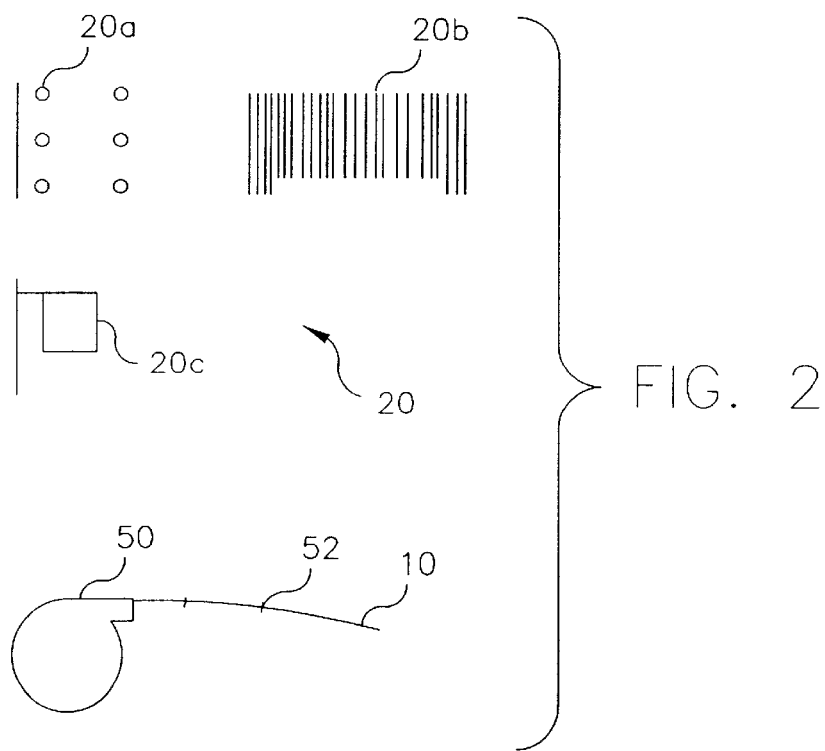
FIG. 2 is a schematic diagram illustrating possible structures of encoded metadata used with the present invention.

Referring to FIG. 2 and elements 20a–20c, the structure of the encoded metadata 20 can take various forms depending on the sophistication of the camera 14 and the needs of the application. For example, in a very simple camera, a stationery set of LED's can write a pattern of density dots (described as a "dot-code" 20a). The camera 14 has a mechanical configuration that generates the dot code 20a and is shown in FIG. 4.

FIG. 4 shows a rear view of the camera 14 against which the filmstrip 10 lies upon, and a side view of the camera 14. A lens 102 is placed roughly 36 mm in front of the plane of the filmstrip 10. A filmgate 104 in the camera 14 permits light from the scene that has passed the lens 102, to reach the filmstrip 10, thus forming a latent image of the scene. Rails 103 as shown in the side view, provide a robust surface against which the filmstrip 10 can slip as the filmstrip 10 advances. Light emitting diodes (LEDs) 101 are recessed into the camera body. Each LED 101 may or may not be energized while the filmstrip 10 is stationary and being encoded with the desired information. Individual bores in the camera's body carry light to the film. Alternate designs for delivering light to the film are well-known to those skilled in camera design. The light may be generated remotely and transported to the film by optical elements. The light may be delivered to the front or to the back surface of the film. The light source may be modulated directly or a discrete light modulator such as an LCD may be used.

FIG. 5 shows a side view of the camera 14. A lens 102 is placed roughly 36 mm in front of the plane of filmstrip 10. Rails 103 as shown in the side view, provide a robust surface against which the filmstrip 10 can slip as the filmstrip 10 advances. A filmgate 104 in the camera 14 permits light from the scene that has passed the lens 102 to reach the filmstrip 10, thus forming a latent image of the scene.

If the camera has a motor drive, a 1-dimensional bar code 20b can be implemented by the camera's 14 mechanical configuration shown in FIG. 4b. FIG. 6 shows a rear view of the camera 14 against which the filmstrip 10 lies upon. A miniature optical projection assembly 108 is placed into a bore in the camera body. The assembly 108 consists of an LED 101 that illuminates an aperture 106, and a lens 107 (shown in FIG. 7) that focuses the aperture onto the filmstrip 10. This provides a narrow line of light on the filmstrip 10. The LED is modulated in time to create the bar code 20b as the filmstrip 10 is moved to the next exposure position by the motor drive of the camera. Alternate designs for delivering light to the filmstrip 10 are well-known to those skilled in camera design. The light may be transported to the filmstrip 10 by fiber optical elements or a small light source may be placed in direct contact with the filmstrip 10. The light may be delivered to the front or back surface of the filmstrip 10. FIG. 7 shows a side view of camera 14. Additional features include an aperture 106, and a lens 107 that focuses the aperture onto the filmstrip 10.

A more sophisticated camera 14 could write one or more, 2-dimensional bar code blocks 20c by the mechanical configuration of camera 14 shown in FIG. 8. FIG. 8 shows a rear view of the camera 14, against which the filmstrip 10 lies upon. FIG. 9 shows a side view of the camera 14. A lens 102 in FIGS. 8 and 9 is placed roughly 36 mm in front of the plane of the filmstrip 10. A filmgate 104 in the camera 14 permits light from the scene, that has passed the lens 102, to reach the filmstrip 10, thus forming a latent image of the scene. Rails 103 that form a part of the filmgate 104 as shown in the rear and side views, provide a robust surface against which the filmstrip 10 can slip as the filmstrip 10 advances.

Referring to FIG. 9, an integral thin film technology liquid crystal display (TFT LCD) assembly 109 is placed close to the film. It is illuminated by a series of LEDs 101 that are recessed in the camera body, along the length of the LED assembly. During a period when the film is stationary, the signals are delivered to the LED array to energize selected transistor, rendering some pixels transparent and others opaque. All of the LEDs are subsequently energized for a short period of time.

In all of the mechanical configurations noted above, the optical marks are written inside the safe frame area of each frame. In the embodiments shown in FIGS. 4 through 9, the marks are written parallel to the long dimension of the film frame. And yet another embodiment of FIGS. 4, 5, 8 and 9 can exclusively write the optical marks parallel to the short dimension of the film frame, or write optical marks of this sort in conjunction with the written marks that are parallel to the long dimension of the film frame.

Referring to FIG. 1, according to a preferred embodiment of the invention, at the beginning and end of the filmstrip 10, one safe frame area 13 is used to record a distinctive pattern 24 that can be detected in a photofinishing operation to indicate that metadata is recorded on the film. In the case of a Single-Use camera which is loaded with film at the factory, this pattern 24 would be created by projection of light through a fixed mask or an LED-modulator onto the film. In the case of reloadable cameras, the pattern-generating means used for each frame would also be used to create this distinctive pattern.

The apparatus for applying the metadata to the safe frame area of the film can also be incorporated in a single use camera, for example by suitably modifying the optical data recording circuit described in U.S. Pat. No. 5,870,639, referenced above, to perform the data exposure in safe frame area of the film.

Figure 3:
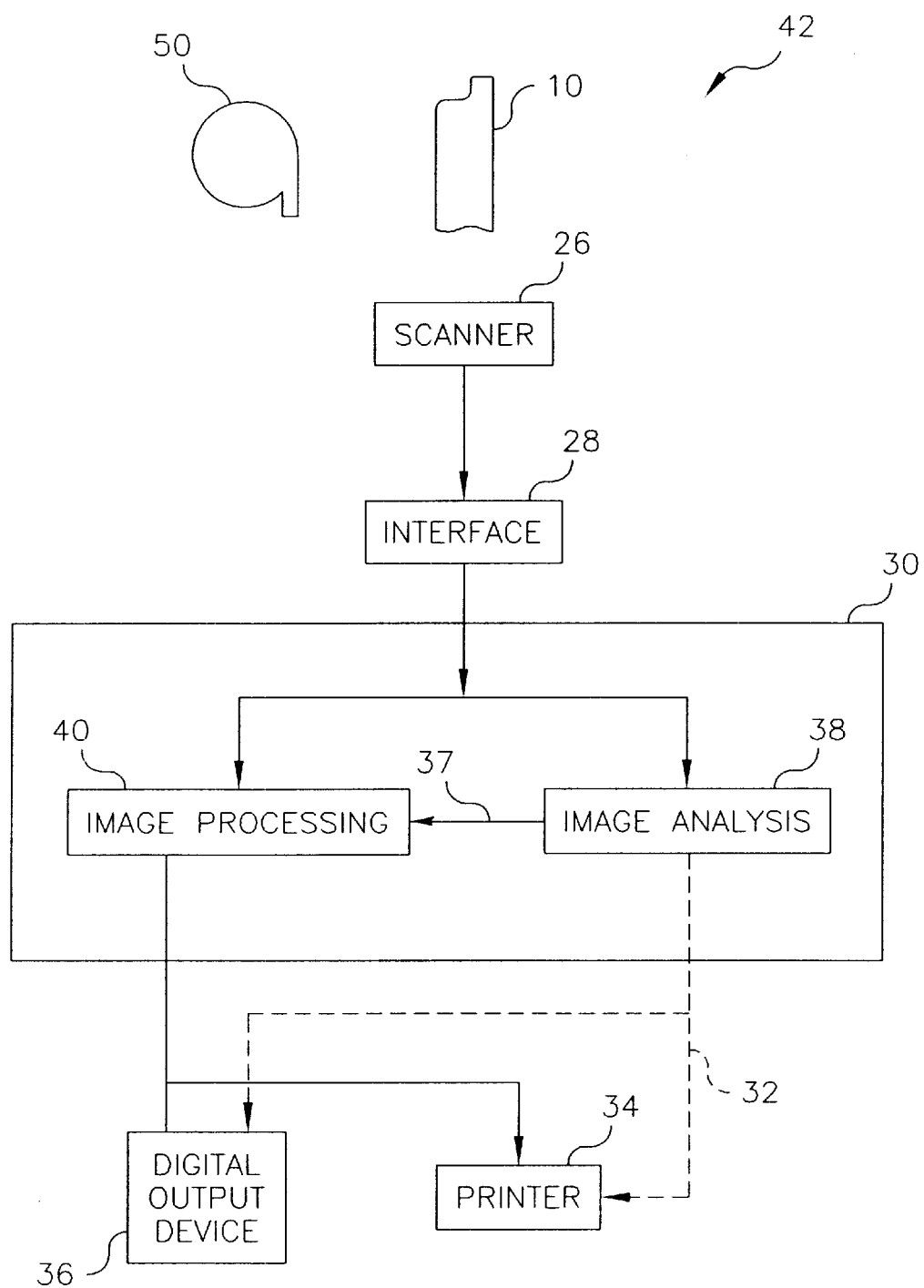
FIG. 3 is a schematic diagram of a photofinishing system according to the present invention.

Referring to FIG. 3, a system 42 for providing photofinishing according to the present invention includes a scanner 26, an interface 28, an image data manager 30, a printer 34, and a digital output device 36. In operation, the scanner 26 scans the image on the safe areas 12 of film 10 in the normal manner to produce a digital image. The digital image data from the scanner 26 is passed through a standard hardware interface, such as a small computer system interface (SCSI) to the image data manager 30. The image data manager 30 includes a plurality of software components that implement various data handling and image processing functions. Among the software components implemented in image data manager 30 are an interface component 28, an image analysis component 38 and an image processing component 40. The interface component 28 usually performs three functions.

First, the interface component 28 delivers commands from the image data manager 30 to the scanner 26 and transmits status from the scanner 26 to the image data manager 30. These commands and status information must be translated from a scanner-dependent format to a scanner-independent format, as expected by the image data manager 30.

Second, the interface component 28 stores the stream of image data sent by the scanner 26 to the image data manager 30 in a temporary buffer, so that all the data from a single strip of film can be presented to analysis and processing algorithms.

Third, the interface component 28 reformats the stream of image data sent by the scanner 26 to the image data manager 30, providing the image information in the sequence and organization expected by the analysis and processing algorithms. The design and operation of the interface software is generally peculiar to a specific scanner and must be modified, if the functionality of the scanner is changed. This is often made more difficult by the fact that portions of the interface software are implemented as driver components within the operating system of the image data manager 30. It is well known that operating system software is more challenging to modify than application software.

The contents of the frame 12 are designed so that known frameline detection algorithms used to locate the edges of the frames 12 will function ordinarily. The digital image data from the scanner 26 is passed through interface 28 to the image data manager 30. The image data manager 30 includes a plurality of components that implement various image processing functions. Among the software components implemented in data manager 30 are an image analysis component 38 and an image processing component 40. The image analysis component 38 provides direction to the image processing component 40 for each frame. The resulting processed digital image is sent to a printer 34 or a digital writing device, e.g., CD writer or an interface to the digital output device 36.

The image analysis component 38 provides direction to the image processing component 40 for each frame. The primary functions of the image analysis component 38 are to classify the recorded image into one of a known set of image classes, such as outdoor, indoor with flash, or indoor with available light; or to measure a specific analog characteristic of the image. This characteristic may deal with the mechanistic exposure to the film, such as the mean optical density of the frame, or it may deal with some characteristic of the recorded scene, such as the location of open space within the image. In modem digital photofinishing systems the image analysis component 38 includes a large number of sub-analyses that neither limit the implementation of this invention, nor need to be modified in the presence of this invention. These sub-analyses are applied to the portion of the frame produced by the scene, as is explained below.

One of the sub-analyses impacts the implementation of this invention. There is no unambiguous means to determine the location of image frames in the 35 mm photographic system. A specific analysis algorithm, known as a frame-line detector, averages the optical density across the film width and identifies a pattern of sudden transitions from low density to high density or from high density to low density. From this pattern, the frame locations are discovered. It is a purpose of this invention to introduce metadata without disturbing the existing algorithms. If the metadata is written parallel to the long dimension of the film frame, the average density across the film will not be substantially disturbed. If the metadata is written parallel to the short dimension of the film frame, it must be designed so that the frame-line detector will reliably place the metadata inside the frame area, rather than outside the frame area. The placement of the metadata can be accomplished by assuring that at least half the width of the film is exposed for all possible coded messages.

Figure 10:
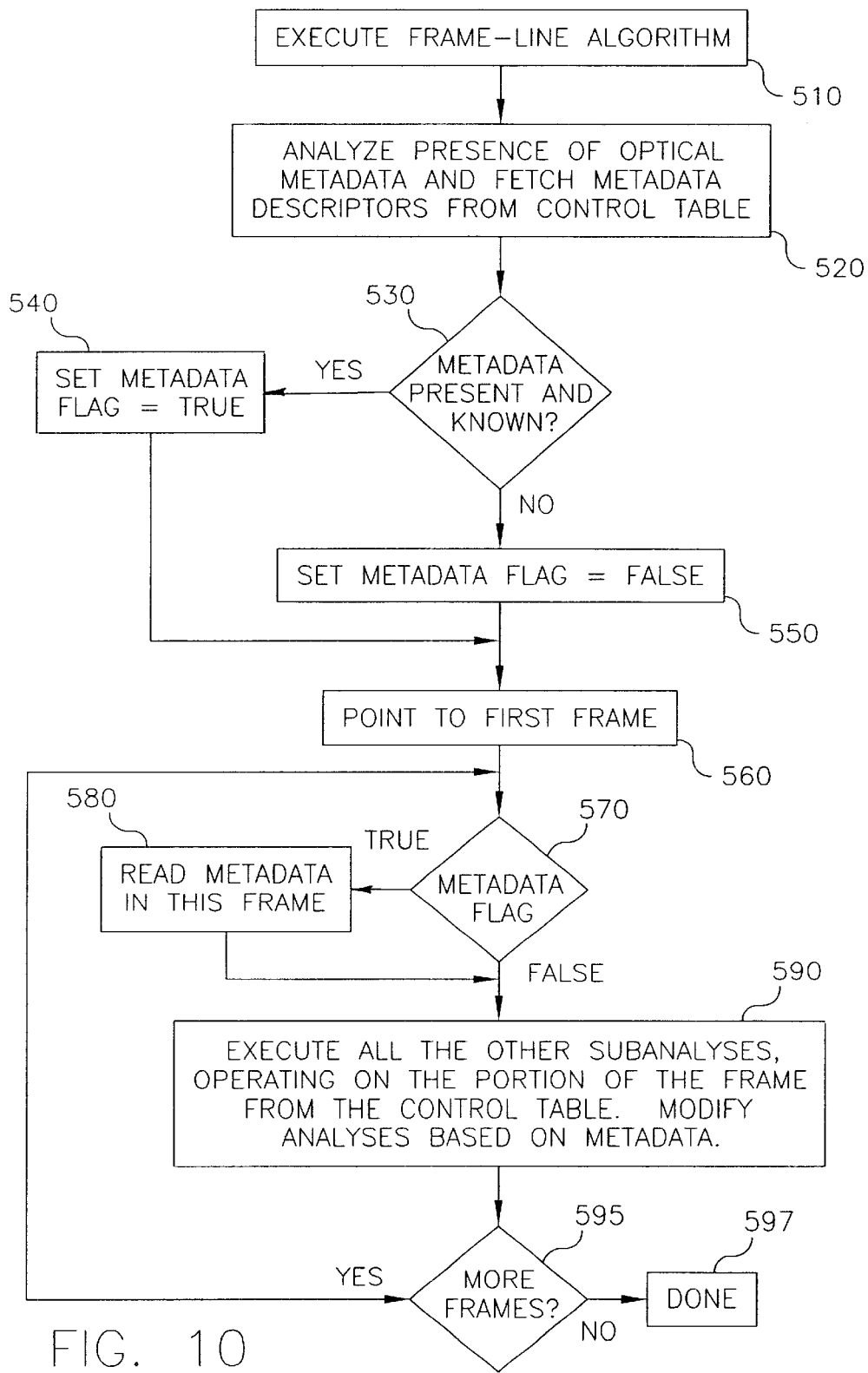
FIG. 10 is a flowchart for analyzing the presence of metadata.

The optically written metadata is detected and interpreted by one sub-analysis element in the image analysis component 38. The relationship between the overall logical flow of the image analysis component 38 and this invention is shown in FIG. 10 with a flowchart. This sub-analysis acts on the temporary buffer representing the image data from the film strip, formed by the interface component 28 and the output of the frame-line detector, also operating in the image analysis component 38.

In the first operation 510, the frame-line algorithm is executed to identify the positions of exposed frames on the film. The result is a set of image data locations that mark the beginning of each frame. Operation 520, analyzes the presence of meaningful optical metadata. This analyzing process of operation 520 is further detailed in FIG. 11.

If metadata is present as determined in operation 530 and the capability to use it is contained in this version of digital photofinishing software, the metadata flag is set to true in operation 540. Operation 550 receives an indication from the metadata flag in operation 530 that no metadata is present and subsequently sets a metadata flag to a false state. Whereupon, operation 560 will point to the first frame, causing a metadata flag 570 to be analyzed further. If metadata flag 570 has a true state, then operation 580 must read the metadata in the first frame. Otherwise, operation 590 will execute all the other sub-analyses that operate on the portion of the frame from the control table. A modification of the analyses based on the metadata is also performed. A recurring question is asked in operation 595: "are there more frames?" If the answer to operation 595 is affirmative, the metadata flag 570 must be analyzed for its current state again. Otherwise, the entire process ends at operation 597.

Figure 11:
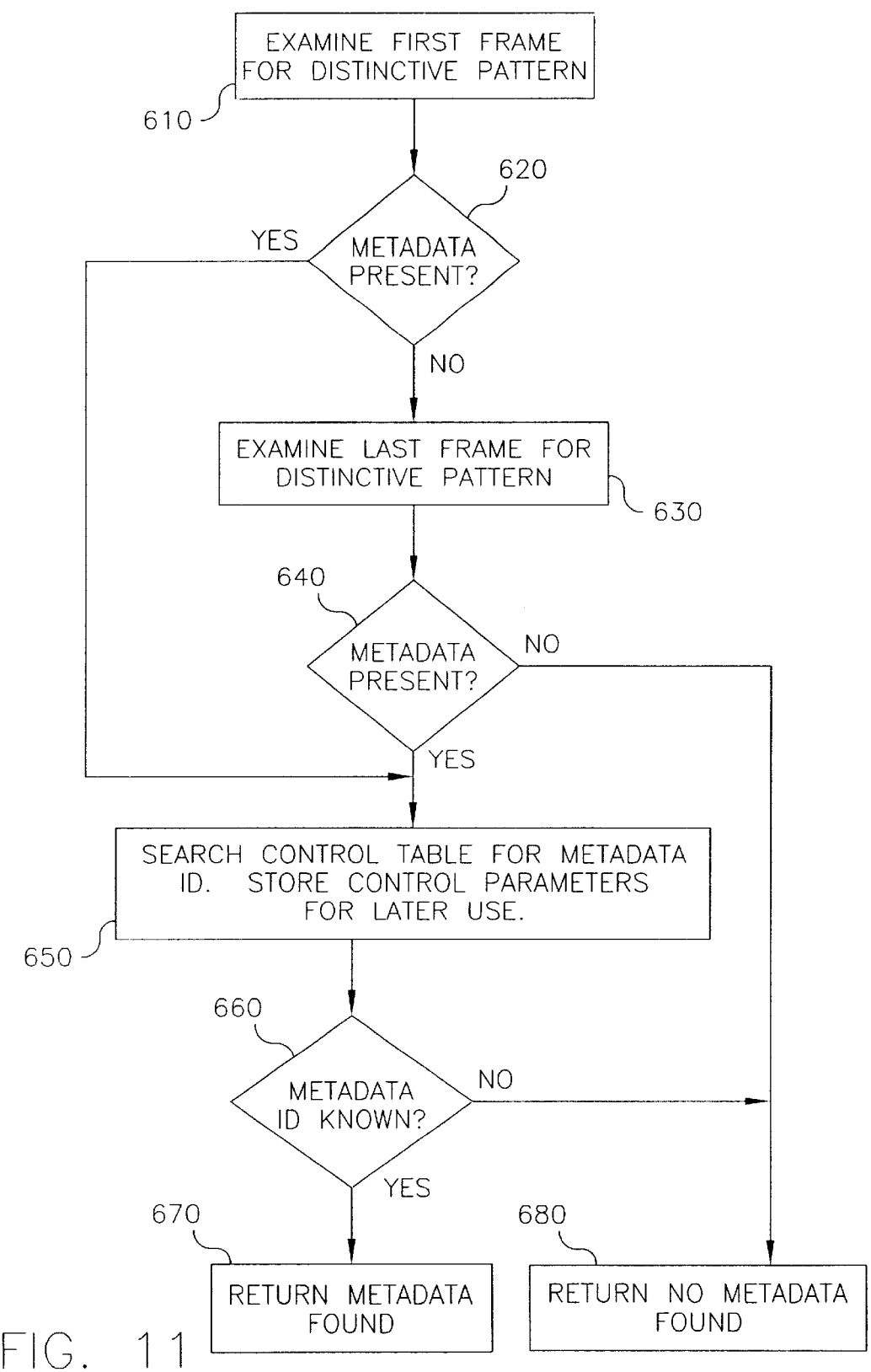
FIG. 11 is a flowchart for searching for distinctive metadata.

The flowchart in FIG. 11 describes a software process for determining the presence of meaningful optical metadata that the process described in the flowchart of FIG. 10 will rely upon. Referring to FIG. 11, the first operating step 610 examines a first frame for distinctive patterns. An initial analyzing step 620 determines whether metadata is present. No presence of metadata will cause operation 630 to examine the last frame for a distinctive pattern. A second analyzing step 640 also determines whether metadata is present.

In the first analyzing step 620 an affirmative presence of metadata causes operation 650 to search a control table for metadata identification, otherwise described as ID. Operation 650 also stores control parameters for subsequent usage. Operation 660 determines whether the metadata ID is known. Should the metadata ID be known, operation 670 causes a return to the process in flowchart with a result that metadata had been found. In contrast, if the metadata ID is unknown, operation 680 causes a return to the process in flowchart with a result that metadata had not been found. It should be noted that a negative presence of metadata as determined by operation 640 will also cause operation 680 to return to the process in flowchart with a result that metadata had not been found.

As previously described, FIG. 11 shows a method for determining whether a film strip contains meaningful optical metadata. The process depends on the use of the first or last frame of the film to store distinctive patterns of density, and for identifying the type of metadata stored, if present. A distinctive pattern is defined as a very coarse pattern of high and low density areas which is unlikely to be created by any photographed scenes.

The first step 610 of the process in FIG. 11 is to examine the first frame discovered on the film for a distinctive pattern. This specific process is further described below with reference to FIGS. 12A and 12B. If the pattern is not found, the last frame is examined for the distinctive pattern once again using the process of FIGS. 12A and 12B. If no pattern is found in either frame, the main software logic flow, as described in FIG. 10, is informed that no metadata can be read from this particular film strip. If the distinctive pattern is found in either the first or last frame, the metadata ID is decoded from the pattern. Those skilled in the art will recognize that there are many ways to encode a number in binary patterns, and that redundant codes can be used to reduce the probability of misinterpretation.

The metadata ID found in the process shown in the flowchart of FIG. 11 is used to search a control table, an example of which is disclosed below.

| Metadata ID | Metadata Region | Scene Image Region | Metadata Format | Human Readable Tag | Feature Set Index |
|---|---|---|---|---|---|
| 1 | (0,0.9)–(1.0,1.0) | (0,0)–(1.0,0.9) | 1 | Pseudo zoom | 25.1 |
| 2 | | | | | |
| 3 | | | | | |

The control table includes six columns: a column for metadata ID designation; a column for metadata regions; a column for scene image regions; a column for metadata formats; a column for human readable tags; and the last column for feature set indexes. If the metadata ID is unknown, the main logical flow is informed that no metadata can be read from this film strip. If the metadata ID is present, the control parameters in the table are returned for further use. Their application is explained above. As noted in FIG. 11, if the metadata is recognized, the control table exemplified above provides information about reading and using the metadata. The metadata ID is read from the first frame or last frame via the process in FIG. 11. The metadata ID is an identification number agreed on by the camera manufacturer and the digital photofinishing manufacturer. These manufacturers also share in the creation of the information recorded in the control table. The metadata region describes the portion of the usable film frame that contains metadata.

For example, where ID=1 in the control table, the metadata is stored across the bottom of the film frame, parallel to it is long side. The scene image region describes the portion of the usable film frame, recorded on the film through the lens. Metadata format is an index to the storage format. For example, the code 1 might indicate a specific dot code 20a; code 2, a specific one-dimensional barcode 20b; code 3, a specific two dimensional barcode 20c, as described earlier in FIG. 2. The human-readable tag and the feature set index are both indicators of the feature or feature set implemented by this metadata. The first indicator is used to track features by the system designers. The second indicator is used in the software of the image analysis component 38 of FIG. 3 to access a software block that implements the feature. In this example, the control table describes for each metadata ID the physical region on the film where metadata should be found, the physical region on the film where the scene image should be found, and an index pointer to the metadata format.

At this juncture, the image data representing each frame of the film is examined, beginning with the first frame. If the metadata flag is true, the metadata is read from the frame. For a dot-code, the location of the dots on the frame is stored in the software and linked to the metadata identification number read above. Each dot is recognized as being a 0, if the pixel value at the known location is less than the mean pixel value in the dot-code region; otherwise, the pixel value is recognized as being a 1, if the pixel value at the known location is greater than the mean pixel value in the dot-code region. Software for reading one-dimensional and two-dimensional barcodes is specific to the barcode used and is well known in the art. Note that the type and location of the metadata is known from the control table. At this point all the rest of the sub-analyses contained in image analysis component 38 are executed. Only the portion of the frame identified by the control table as image is submitted to these sub-analyses. Some of these sub-analyses may be modified by metadata values read from this frame. These situations are identified based on the control table entry "feature set index." If there are more frames to be analyzed, this process repeats in a loop. Examination for a distinctive pattern, either found in the first or last frame of the film strip, is thus accomplished. This distinctive pattern provides a key to the format and meaning of the metadata stored in each frame. The digital photofinishing system is capable of interpreting and acting on a specific instance of metadata only if its image analysis component 38 has been programmed to respond to its specific key.

The collection of results 37 from these analyses is sent to the image processing component 40. The image processing component 40 performs two key functions. First, it implements a set of rules that prescribe the image processing steps required for a given combination of image analyses. Second, it executes a specific sequence of image processing steps on each frame of the image data provided by the interface component.

For example, based on the results of the analyses, the image data corresponding to the third frame on the film strip might be passed through a specific three-dimensional lookup table and given a specific degree of image sharpening. The resulting processed digital image is sent to a printer 34 or a digital writing device, e.g., CD writer or an interface to the Internet 36. If the metadata extracted from the image by the image analysis component 38 is used by the image data manager 30 for annotation rather than image modification, it is written on the back of the print by printer 34, or into the header of the digital file by digital output device 36, as indicated by transfer path 32.

Figure 12A:
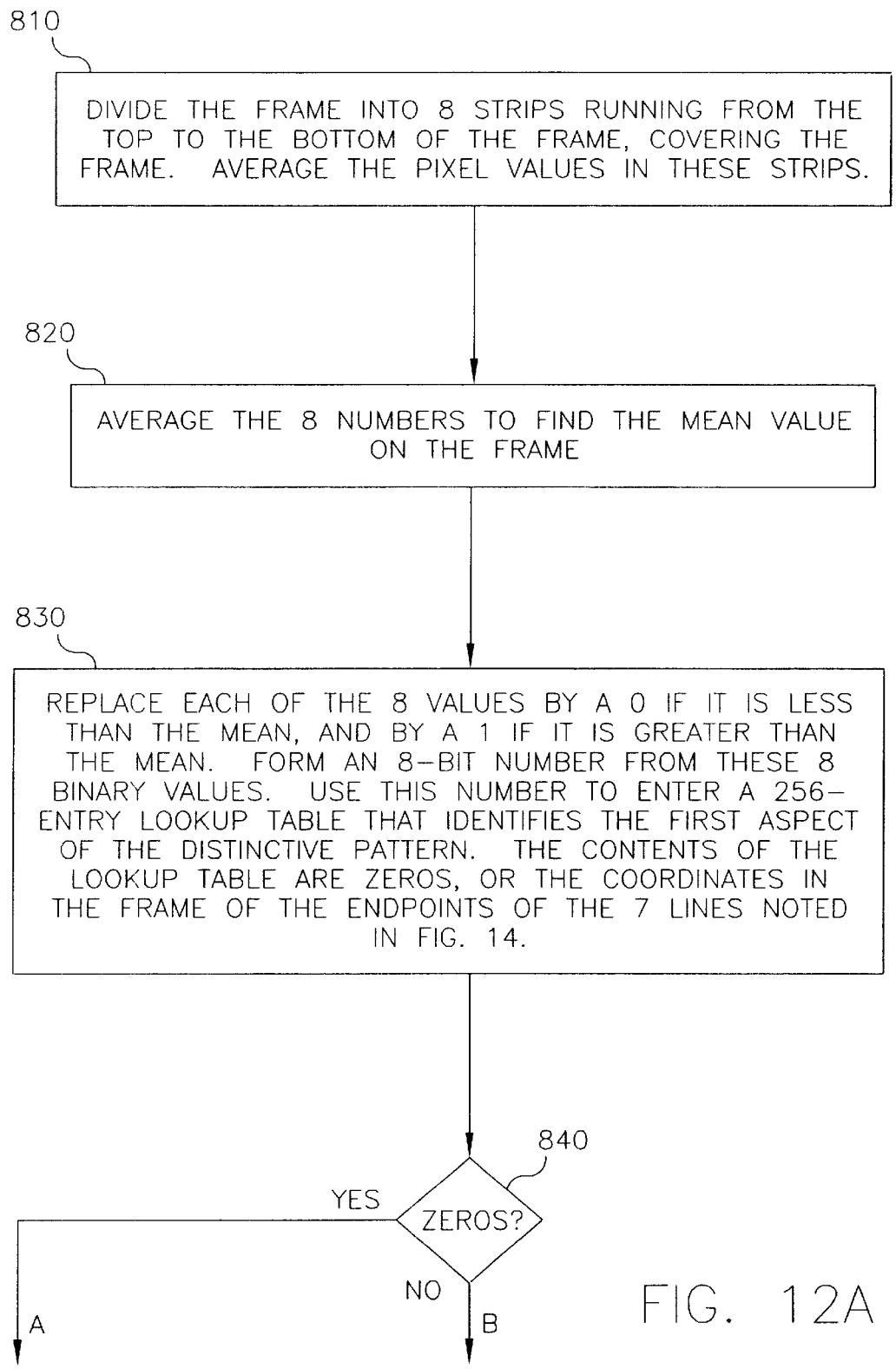
FIGS. 12A and 12B are flowcharts for forming a distinctive metadata ID.
Figure 12B:
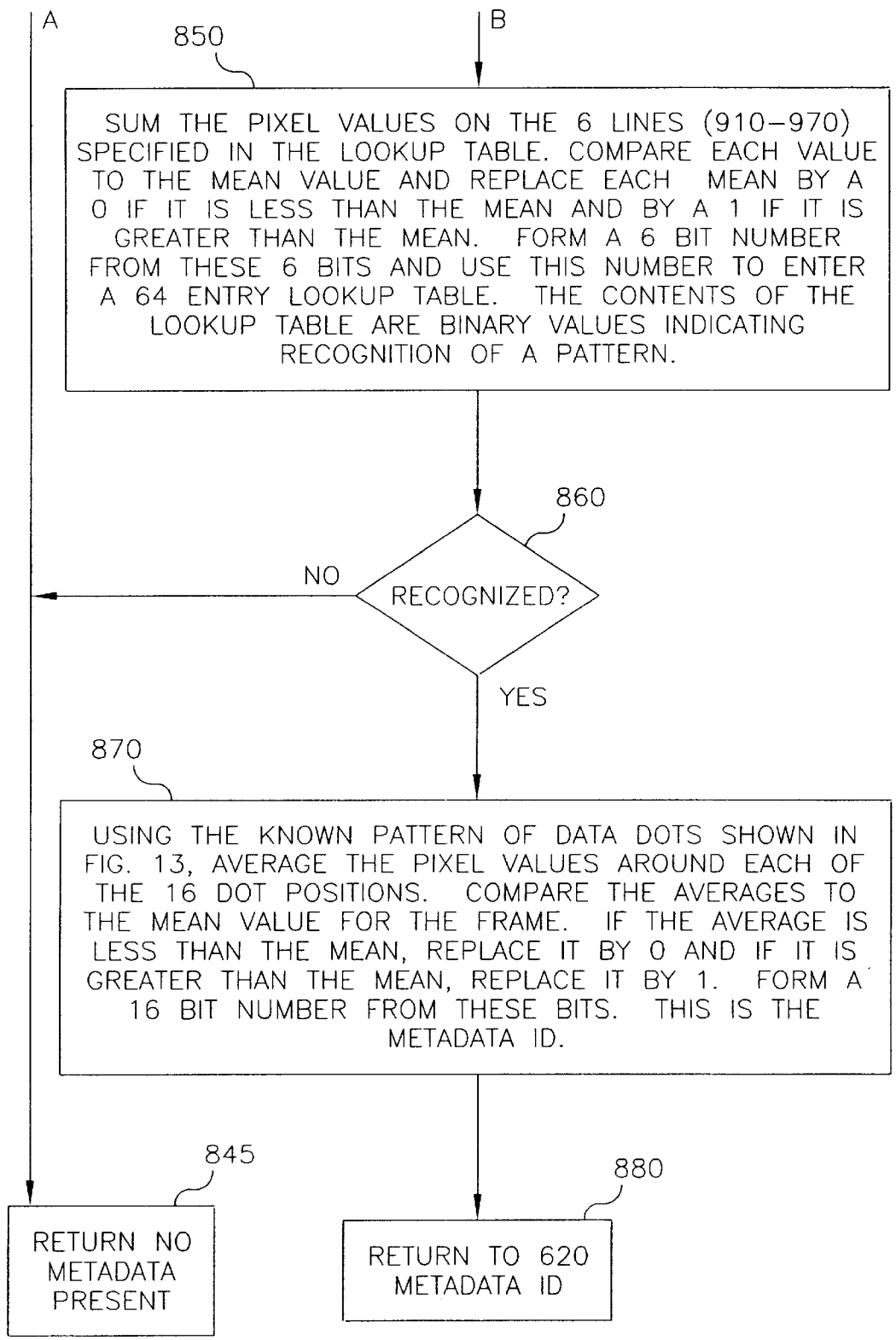

FIGS. 12A and 12B shows a method for implementing steps 610 and 630 of FIG. 11 in more detail. The method has been written to work with the distinctive pattern shown later in FIG. 13. The distinctive pattern has been co-designed with the method for detecting it, so as to make the method both simple and reliable. The input to the process diagrammed in FIGS. 12A and 12B is the image data for the first or last film frame. The first operation 810 in the process is to measure the average pixel value in each of eight regions, each region running from the top to the bottom of the frame and together covering the entire frame. Next, an average of the total average pixel values 820 is conducted to find the mean value in the frame. This mean value is used to determine in operation 830 if, on average, each of the eight strip-averages is above or below the mean. This produces from the image content eight bits, which can be joined in a fixed order to create an eight-bit number, ranging in value from 0 to 255. The value generated in this process by the distinctive pattern in FIG. 13 will not always be the same, due to shifts in the position of the pattern across the frame and due to the image content, but only a small subset of the numbers can be generated. A lookup operation based on the eight-bit number is used to identify a first aspect of the distinctive pattern, rejecting most scenes and all frames of uniform value. This same lookup operation, part of 830, provides a set of image coordinates providing a means to further identify the distinctive pattern.

If the lookup table entry is zero in inquiry operation 840, the distinctive pattern is likely not present, and operation 845 returns this information to the calling program of FIG. 11. An example of a distinctive metadata pattern 900 is shown in FIG. 14. In order to further determine the presence of the distinctive pattern 900, the lookup table contains the locations of the endpoints of 6 lines, 910, 920, 930, 940, 950, and 960, as disclosed by FIG. 14. A reference line 970 is also shown in FIG. 14. If the pattern 900 is present, the mean value along lines 920 and 950 will be much higher than the mean values along lines 910, 930, 940, and 960. This set of lines has been co-designed with the distinctive pattern in FIG. 13. Operation 850 implements this test for a second aspect of the distinctive pattern. Again, this can be recognized via a lookup table entered from the 6 bits representing the intensities in the 6 lines. Operation 860 tests the entry in the lookup table, which will be a logical true if the pattern in the frame matches the distinctive pattern. Very few scenes contain a pattern of pixel values that match this distinctive pattern. If the pattern in the frame does not match the distinctive pattern, operation 845 returns this information to the calling program of FIG. 11. Hence, FIG. 14 represents a tool for flowchart 800 in FIGS. 12A and 12B. It should be noted that FIG. 13 is merely one example of a possible distinctive pattern that could be implemented.

Figure 13:
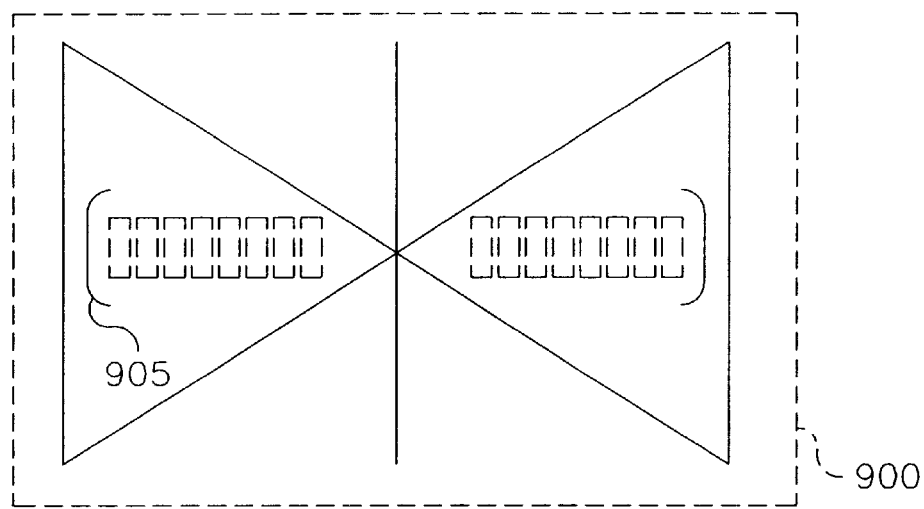
FIG. 13 is an example of a distinctive metadata pattern.
Figure 14:
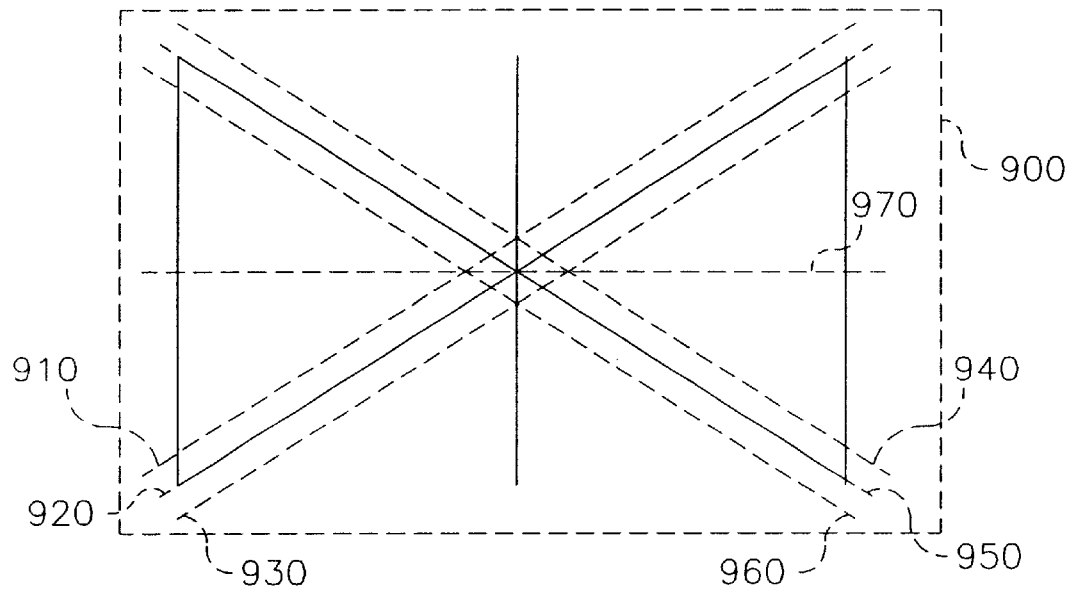
FIG. 14 is a further elaboration of forming a distinctive metadata ID using the flowchart of FIGS. 12A and 12B.

If the pattern is recognized, operation 870 examines the image data in the frame at a plurality of locations 905 noted in FIG. 13. These locations 905 contain high or low optical density as part of the distinctive pattern and serve to identify the specific content of the film strip. They are compared to the mean frame density to create a series of digital bits which are concatenated in a fixed sequence to form the metadata ID. This metadata ID is returned to the calling program of FIG. 11 by operation 880.

In another embodiment, where a standalone computer or retail photofinisher is used, the filmstrip 10 is fed to a scanner 26, which is part of the digital photofinishing system 42. In contrast, for another embodiment, at a wholesale photofinisher, the filmstrip 10 shown in FIG. 3 is usually batched with many other rolls of filmstrip, to form a spool of film 50, joined together with splices 52, thus forming a different type of digital photofinishing system. Regardless which digital photofinishing system is used, because the pattern 24 is recorded on both ends of the filmstrip 10, either system can recognize the filmstrip 10 as special, and requiring special processing with the existing photofinishing hardware. A photofinisher need not create unique processing batches that contain film solely from these special metadata writing cameras. This feature of the present invention is critical because implementing a limited number of special cameras in an established photofinishing environment has to remain simple. A photofinisher need not modify her photofinishing hardware to process metadata laden film.

The advantage of this invention may be appreciated by considering how few components of the photofinishing system 42 have to be modified to handle the metadata 20 encoded on the film. For example, the scanner 26, the interface 28, and most of the image data manager 30, is indifferent to the presence of the metadata 20. A 35 mm format photographic film may be used or another film format may be suitable. Only the image analysis component 38 must be modified to deal with the metadata 20 stored in this manner. The same system 42 can handle metadata 20 encoded as "dot-code" 20a, "1-dimensional bar-code" 20b, or "2-dimensional barcode" 20c or some intermixed version of the three code types.

If a filmstrip 10 encoded in this manner is printed by a device not aware of the metadata, the resulting print will still be recognizable, although the metadata will be visible as well. In yet another embodiment, the coding system 20c is used, yielding metadata wherein the encoded information looks like a noisy gray border and results in the optical print being slightly less objectionable to a viewer.

This invention has been described with reference to a preferred embodiment. However, it will be appreciated that variations and modifications can be effected by a person of ordinary skill in the art without departing from the scope of the invention.

| PARTS LIST | |
|---|---|
| 10 | filmstrip |
| 11 | row of perforations |
| 12 | safe frame areas |
| 13 | safe frame used to record pattern |
| 14 | camera |
| 16 | first region |
| 18 | recorded image of a scene |
| 19 | second region |
| 20 | encoded metadata |

-continued

PARTS LIST

| | |
|---|---|
| 20a | dot code |
| 20b | barcode |
| 20c | two dimensional barcode |
| 24 | distinctive pattern in safe frame area |
| 26 | scanner |
| 28 | interface |
| 30 | image data manager |
| 32 | transfer path |
| 34 | printer |
| 36 | digital output device |
| 37 | collection of results |
| 38 | image analysis component |
| 40 | image processing component |
| 42 | photofinishing system |
| 50 | spool of film |
| 52 | film splices |
| 101 | recessed LEDs |
| 102 | lens |
| 103 | rails |
| 104 | filmgate |
| 106 | aperture |
| 107 | focusing lens |
| 108 | projection assembly |
| 109 | TFT LCD assembly |
| 510 | first operation |
| 520 | second operation |
| 530 | third operation |
| 540 | fourth operation |
| 550 | fifth operation |
| 560 | sixth operation |
| 570 | seventh operation |
| 580 | eighth operation |
| 590 | ninth operation |
| 595 | inquiry |
| 597 | end operation |
| 610 | operation step |
| 620 | first analyzing step |
| 630 | operation step |
| 640 | second analyzing step |
| 650 | operation step |
| 660 | operation step |
| 670 | operation step |
| 680 | operation step |
| 810 | first operation |
| 820 | second operation |
| 830 | third operation |
| 840 | first inquiry |
| 845 | first return operation |
| 850 | fourth operation |
| 860 | second inquiry |
| 870 | fifth operation |
| 880 | second return operation |
| 900 | an example of a distinctive metadata pattern |
| 905 | plurality of locations for recording metadata ID |
| 910 | first line having a pixel value in a lookup table |
| 920 | second line having a pixel value in a lookup table |
| 930 | third line having a pixel value in a lookup table |
| 940 | fourth line having a pixel value in a lookup table |
| 950 | fifth line having a pixel value in a lookup table |
| 960 | sixth line having a pixel value in a lookup table |
| 970 | reference line for distinctive metadata pattern |

What is claimed is:

1. A photofinishing method, comprising the steps of:
a) exposing machine readable metadata and a scene image within an entire safe frame area on a filmstrip;
b) processing the filmstrip to produce a visible image including the machine readable metadata and the scene image;
c) scanning the safe frame area to produce a digital image;
d) extracting the machine readable metadata from the digital image;
e) extracting the scene image from the digital image;
f) processing the scene image according to the extracted machine readable metadata;
g) recording a distinctive pattern in the entire safe frame area at a beginning and end of the filmstrip to indicate that the filmstrip contains the machine readable metadata; and
h) detecting the distinctive pattern on the filmstrip prior to extracting the machine readable metadata from the digital image.

2. The method claimed in claim 1, further comprising the steps of:
reformatting the processed scene image; and
printing the processed scene image.

3. The method claimed in claim 1, wherein the machine readable metadata and the scene image are exposed in separate portions of the safe frame area.

4. The method claimed in claim 3, wherein the machine readable metadata is isolated from the scene image by a distinctive color pattern.

5. The method claimed in claim 1, further comprising the steps of:
a) passing the filmstrip through hardware interfaces;
b) passing the filmstrip through software interfaces;
c) delivering the filmstrip to a computational engine;
d) decoding the filmstrip; and
e) modifying the scene image data to produce a digital image.

6. The method claimed in claim 1 further comprising the step of creating the machine readable metadata from a light emitting diode (LED).

7. The method claimed in claim 1, wherein the machine readable metadata comprises one or more discrete dots in a predetermined pattern.

8. The method claimed in claim 1, wherein the machine readable metadata comprises at least one barcode.

9. A photographic system for transmitting information from a film camera to a processing device, comprising:
a) a means for producing optical marks within a normal picture frame of filmstrip having a captured scene;
b) a means for processing film to convert a latent image to a visible image;
c) a means for detecting a distinctive pattern at both ends of the filmstrip, wherein the distinctive pattern declares that the filmstrip contains metadata;
d) a means for separating the visible image arising from the captured scene from the optical marks; and
e) a means for converting the visible image to a digitally formatted image produced corresponding to the optical marks.

10. A photo finishing system, comprising:
a) means for exposing metadata and scene image within a safe frame area on a film-strip;
b) means for recording a distinctive pattern in the safe frame area at the beginning and end of the filmstrip to indicate that the filmstrip contains the metadata;
c) means for chemically processing the filmstrip to produce a visible image and detectable metadata;
d) means for scanning the safe frame area to produce a digital image;
e) means for detecting the distinctive pattern on the filmstrip;
f) means for extracting the metadata from the digital image;
g) means for extracting the scene image from the digital image; and
h) means for processing the scene image according to an extracted metadata.

* * * * *